(12) United States Patent
Andrey et al.

(10) Patent No.: US 10,224,790 B2
(45) Date of Patent: Mar. 5, 2019

(54) METHOD FOR THE MANUFACTURE OF ACTUATORS

(71) Applicant: JOHNSON ELECTRIC INTERNATIONAL AG, Murten (CH)

(72) Inventors: Donat Andrey, Fribourg (CH); Michael Watzek, Courchevaux (CH); Tanh Bui, Corminboeuf (CH); Yvan Bourqui, Corminboeuf (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 123 days.

(21) Appl. No.: 15/260,658

(22) Filed: Sep. 9, 2016

(65) Prior Publication Data

US 2017/0070130 A1 Mar. 9, 2017

(30) Foreign Application Priority Data

Sep. 9, 2015 (CH) ..................... 01302/15

(51) Int. Cl.
*H02K 15/00* (2006.01)
*H02K 15/16* (2006.01)
*H02K 11/21* (2016.01)
*H02K 5/00* (2006.01)
*H02K 15/14* (2006.01)
*H02K 7/116* (2006.01)

(52) U.S. Cl.
CPC ............ *H02K 15/16* (2013.01); *H02K 5/00* (2013.01); *H02K 7/1166* (2013.01); *H02K 11/21* (2016.01); *H02K 15/00* (2013.01); *H02K 15/14* (2013.01); *H02K 2213/09* (2013.01); *Y10T 29/49009* (2015.01)

(58) Field of Classification Search
CPC ............ B60L 11/1892; B60H 1/00664; B60H 1/00735; B60H 1/00835; B60W 20/00; F24F 11/0001; F24F 2110/40; H02K 11/21; F15B 2211/6654; F15B 2211/6656; F15B 9/03; Y10T 29/49009
USPC ..................... 29/596, 428, 593, 598, 893
See application file for complete search history.

(56) References Cited

U.S. PATENT DOCUMENTS 6,711,486 B1 * 3/2004 Karlsson ................ F16D 48/06
  477/166
7,070,117 B2 * 7/2006 Kook ................ B60H 1/00857
  236/1 C \* cited by examiner

*Primary Examiner* — Thiem Phan
(74) *Attorney, Agent, or Firm* — Muncy, Geissler, Olds & Lowe, P.C.

(57) ABSTRACT

In a method for the manufacture of actuators comprising an electric motor for driving an output shaft (10), a sensor device for generating a signal that is a function of the angle at which the output shaft is rotated, and a support surface (30*a*) with mounting points for mounting an actuator, a mechanical adjustment of at least one actuator component is carried out, which takes place depending on the deviation between an actual value and a setpoint such that the output shaft has an output end (40*b*), the angular position of which is adjusted to the setpoint.

20 Claims, 4 Drawing Sheets

METHOD FOR THE MANUFACTURE OF ACTUATORS

CROSS REFERENCE TO RELATED APPLICATIONS

This non-provisional patent application claims priority under 35 U.S.C. § 119(a) from patent application Ser. No. 01302/15 filed in Switzerland on Sep. 9, 2015, the entire contents of which are hereby incorporated by reference.

FIELD OF THE INVENTION

The invention relates to a method for the manufacture of actuators comprising an electric motor for driving an output shaft, a sensor device for generating a signal which is a function of the angle at which the output shaft is rotated, and a support surface with mounting points for the mounting of an actuator.

BACKGROUND OF THE INVENTION

These sorts of actuators are used in order to drive movable adjustment components, for instance a flap in the air conditioning unit of an automobile.

Following production, actuators are ready for installation at the place of action. Normally, specifications for doing so exactly prescribe the place of installation where an actuator is to be mounted and how the output shaft should be positioned so that it can be coupled with the adjustment components. As a result of manufacturing-related tolerances, however, the sensor device does not in some cases supply precise values for the actual position of the output shaft at the very beginning. Therefore, an electronic calibration is carried out subsequent to the installation of an actuator, whereby the electronic controller is reprogrammed. In doing so, the output shaft and the installed components coupled to it are moved from their initial position to their final position and calibrated according to the signal supplied by the sensor device. This electronic calibration does in fact enable the sensor device to precisely determine the angular position of the output shaft and thereby the adjustment components. However, this involves additional installation cost, making said installation more complicated.

SUMMARY OF THE INVENTION

An object of the present invention is to indicate a method by which actuators can be manufactured which have been configured prior to their installation at the place of action in a way that enables a more precise determination of the angular position of the output shaft.

The invention solves this problem with the method according to one of the independent method claims. The dependent claims define preferential embodiments for the respective methods, an actuator manufactured using one of the methods according to the invention as well as a unit and a motor vehicle with at least one of this type of actuator.

For the method according to claim 1, a method step is provided in which a mechanical adjustment of at least one of the actuator components takes place, such that the output shaft has an output end, the angular position of which is compared with a setpoint.

As an example, the mechanical adjustment occurs in that components are provided which are designed to perform the same function as the actuator but are mechanically different. Depending on the deviation between the actual angular position of the output shaft and a setpoint, a suitable component is selected and used in the manufacture of the actuator. Alternatively or additionally, the mechanical adjustment occurs in that, depending on the deviation, one of the actuator components is configured by, for example, making and/or preparing one or more mounting holes.

For the method according to claim 2, an actual value is determined using data supplied by a sensor device for a predetermined angular position of the output shaft, whereby at least one actuator component is mechanically adjusted so that the signal supplied by the sensor device is compared to the setpoint. As an example, in an arrangement comprising at least one sensor device part, a specific component of the sensor device such as a printer circuit board and/or a slider, is selected or configured at a measurement station according to the measurement data.

For the method according to claim 3, in a prepared arrangement, an actual value is defined based on data comprising the signal value supplied by the sensor device for the predetermined angular position, whereby in cases when the deviation between the setpoint and the actual value exceed a threshold value, the mechanical adjustment of at least one component of a subsequently manufactured actuator is carried out. As an example, following the production of an actuator, the signal value supplied by the sensor device for the predetermined angular position of the output shaft is recorded and compared with the values for the previously produced actuators. These values exist, for example, as a moving mean. If the signal value deviates too greatly from the mean value, then the production of the subsequent actuators will be so adjusted. An actuator with too great a deviation can, if needed, be removed from production as a reject.

The methods according to the invention have the advantage that, following production, the actuators are configured in such a way that the sensor device supplies a more exact signal for the angular position of the output shaft. As a consequence, the adjustment of the actuator subsequent to installation can be omitted.

BRIEF DESCRIPTION OF THE DRAWINGS

In the following, the invention will be explained on the basis of preferential embodiments making reference to drawings. Shown are.

DETAILED DESCRIPTION OF THE PREFERRED EMBODIMENTS

Figure 1:
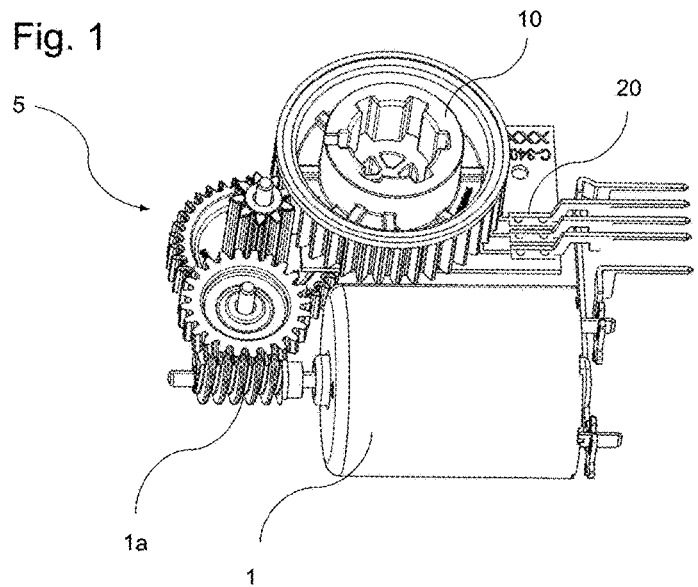
FIG. 1 a perspective view of various actuator components.

The actuator shown in FIG. 1 has an electric motor 1 with an output shaft 1a, which is coupled with an output shaft 10 via a gear assembly 5, as well as a sensor device 20, which serves to sense the angular position of the output shaft 10. In addition, for controlling the electric motor, the actuator has an electronic controller (not shown here), which, as an example, is arranged on a printed circuit board.

Figure 2:
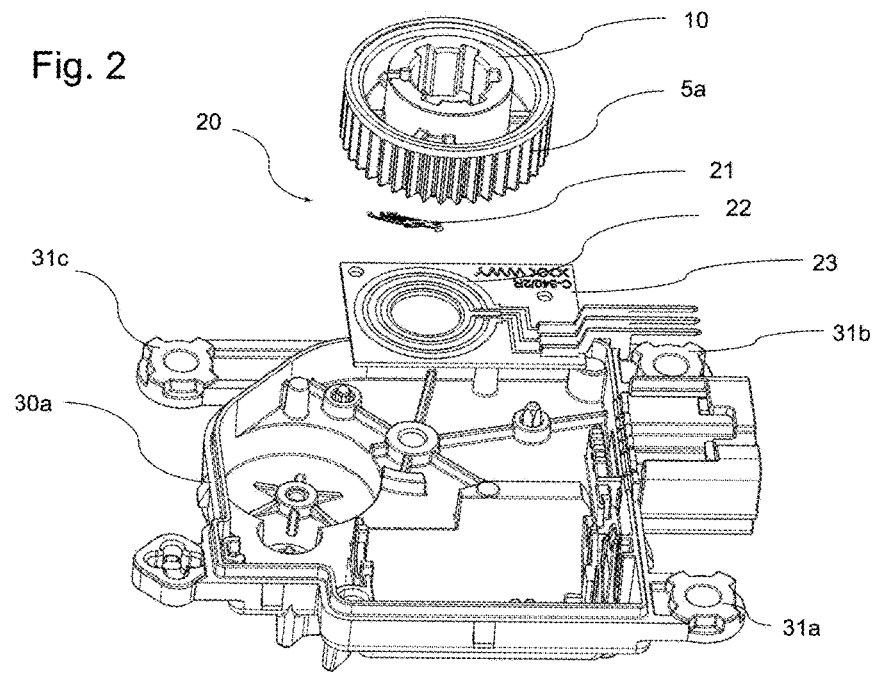
FIG. 2 an exploded view of the components from FIG. 1 together with a housing shell, whereby the electric motor and a portion of the gear assembly are not shown.

The sensor device 20 includes, as an example, a potentiometer, which supplies a signal as a function of the angular position of the output shaft 10. FIG. 2 shows one possible example of this type of sensor device 20. It has a slider 21, which is attached to a gear element 5a of the gear assembly 5 and which is movable along one or more conducting paths 22. These are arranged on a printed circuit board 23, which in this case has connector pins.

In an example according to FIG. 2, the potentiometer is coupled to the gear element 5a, which is the last stage in the gear assembly, and which is connected to the output shaft via a torsionally rigid coupling. It is also possible for the sensor device 20 to be designed so that a potentiometer is coupled to a different gear element in the gear assembly 5, or to the output shaft 1a of the electric motor 1. It is also conceivable that, instead of a potentiometer, the sensor device 20 is designed for the non-contact sensing of the angular position. As an example, a magnet could be provided, which is arranged on one of the gear elements and interacts with a stationary magnetic field sensor such as a Hall sensor.

Figure 7:
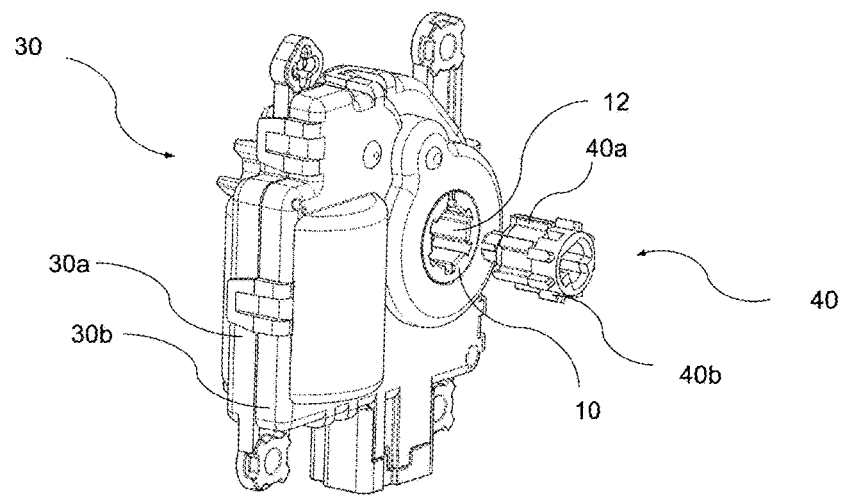

Components 1, 5, and 20 are arranged within a housing 30, as in FIG. 7. The housing 30 has a first housing element in the form of a housing shell 30a, which can be seen is FIG. 2 and which is combinable with a second housing element in the form of a housing cover 30b. The housing 30 is provided with a through-hole so that the output shaft 10 is accessible from the outside, as in FIG. 3. It is further provided with mounting points 31a-31c in order to install the actuator on a mounting surface, which, as an example, is part of an air conditioning unit. In the present embodiment, the mounting points 31a-31c are arranged on the housing shell 30a, which serves as a support surface for components 1, 5 and 20. The mounting points 31a-31c are formed here as extensions, which are designed as a single piece together with the housing shell 30a. Different choices could also be made for the number of mounting points 31a-31c as well as their design and position. It is also conceivable that components 1, 5 and 20 be arranged on a separate support surface, which has mounting points and which is different from the housing 30.

Figure 3:
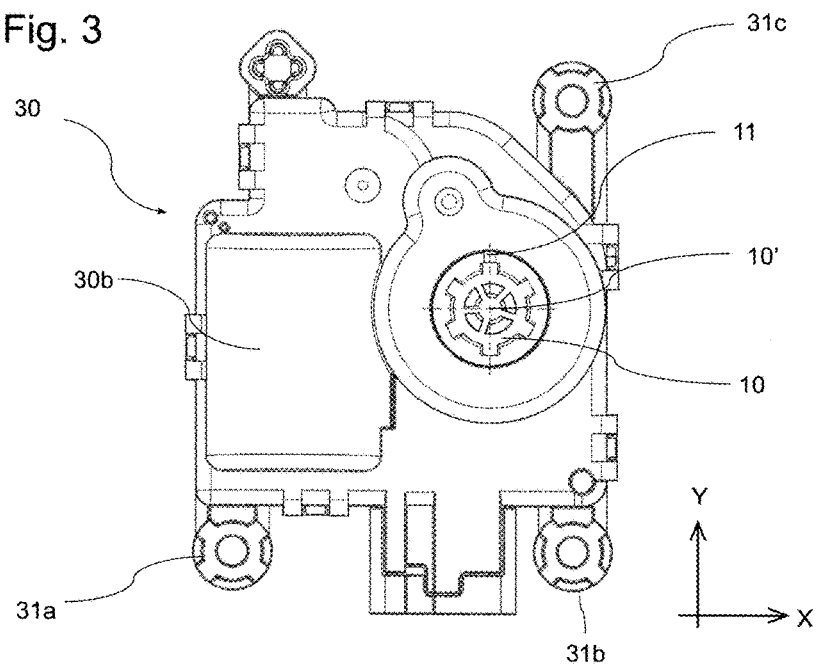
FIG. 3 a plan view of the actuator, which comprises the components from FIG. 1, FIG. 4 a graph, which shows a signal supplied by the sensor device before and after the mechanical adjustment, FIG. 5 a side view of an additional component, which can be paired with the actuator according to FIG. 3, FIG. 6 a plan view of the additional component according to FIG. 5, FIG. 7 a perspective view of the actuator according to FIG. 3 and the additional component according to FIG. 5, FIG. 8 a plan view of a further example of an actuator, the mounting points of which are configurable, FIG. 9 the graph according to FIG. 4, wherein the deviation by which the signal supplied by the sensor device deviates from the setpoint is specified, and FIG. 10 a further example of a configurable actuator component according to FIG. 1.

In FIG. 3, the x and y axes of a coordinate system are indicated. The third axis in the coordinate system, z, runs in this case perpendicular to the surface of the page and is parallel to the axis 10', around which the output shaft 10 is rotatable. Defined in this xyz coordinate system are both the predetermined positions of the installation points on the installation surface, which correspond to the mounting points 31a-31c, as well as the position and orientation of the place at which the output shaft 10.

is to be coupled to the component to be moved, such as a flap. Ideally, the output shaft 10 in this xyz coordinate system has a previously known angular position when the actuator is installed on the installation surface, and the sensor device 10 supplies a previously known signal value. As an example, the output shaft 10 is rotatable between an initial position and a final position, whereby the sensor device 20 supplies a previously known value for the respective position. However, due to manufacturing tolerances which, for example, stem from the production of the sensor device 20 and/or other parts of the actuator, deviations can occur which lead to a discrepancy between the signal supplied by the sensor device 20 and the angular position of the output shaft 10. The deviations can typically be within a range of several degrees.

Figure 4:
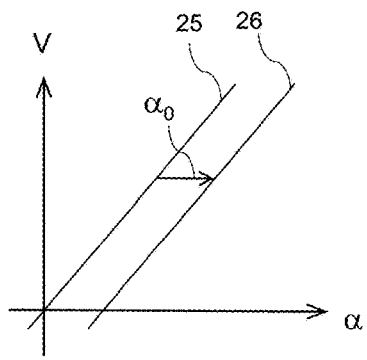

FIG. 4 shows an example in which the signal value V, which is given as an example in volts, supplied by the sensor device 20, is depicted as a function of the angle $\alpha$, around which the output shaft 10 is turned. The waveform 25 corresponds to the ideal state, while the waveform 26 comes from an uncalibrated sensor device 20 and shows a deviation of $\alpha_0$ along the horizontal axis.

In order to compensate for this deviation $\alpha_0$, a mechanical adjustment is already carried out during production. This can be achieved in a variety of ways.

EXAMPLE 1

The actuator is fabricated to the extent shown in FIG. 3. The mounting points 31a-31c have already been completely prepared by, as an example, the mounting holes being fitted, through which screws or bolts can be fed for installing the actuator on the installation surface. The mounting points 31a-31c thus define the position of the actuator in relation to the xyz coordinate system. The output shaft 10 is moved so that the sensor device 20 supplies a predetermined signal value. Based on the ideal waveform 25, the setpoint is known for the angle at which the output shaft 10 should be turned. The actual position of the output shaft 10 is then measured. This results in the deviation $\alpha_0$ to be compensated for. The measurement can, as an example, be made using a gauge, which is attached to the mounting points 31a-31c and has a marking showing the target position for the output shaft 10. In order to visually identify the actual angular position of the output shaft 10, this can be provided with a marking 11.

Figure 5:
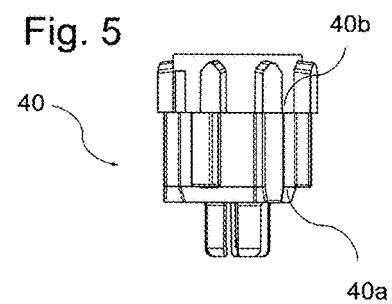
Figure 6:
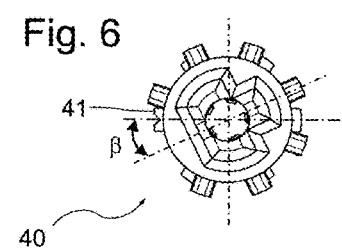

Then, from a number of different additional parts provided, a suitable one is chosen and attached to the output shaft 10. FIGS. 5 and 6 show an example of this type of additional part 40. It has an input end 40a and an output end 40b. The ends, 40a and 40b, are arranged by being rotated with respect to one another at an angle $\beta$. A variety of additional parts are provided by different choices being made for this angle $\beta$.

To facilitate an error-free attachment process, the input end 40a can be provided with a marking 41, which should be placed adjacent to the marking 11 on the output shaft 10.

The output shaft 10 is provided with an cavity 12, which can accept the output end 40a, as in FIG. 7. The cavity 12 and the input end 40a are designed to be essentially compatible with one another and have a circular shape. Thus, a torsionally rigid connection can be made by inserting the input end 40a into the cavity 12. Of course, there are also other possible designs for attaching the additional part 40 to the output shaft 10.

The output end 40b is formed so that it can preferentially be directly coupled to the adjustment component that is to be moved using the actuator.

EXAMPLE 2

Figure 8:
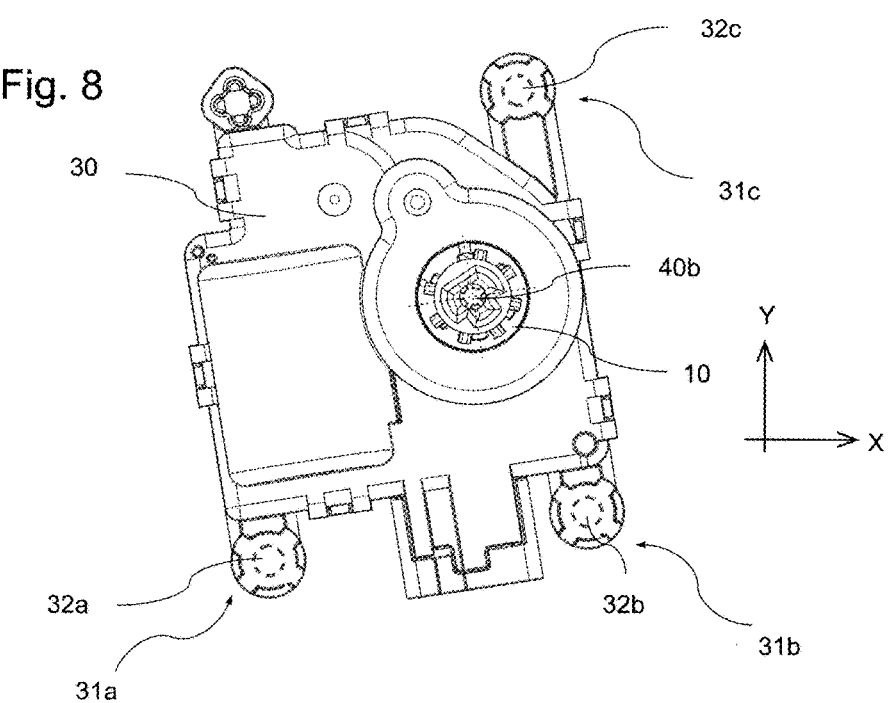

The actuator is fabricated to the extent shown in FIG. 8. The mounting points 31a-31c are not yet completely prepared. As an example, the mounting holes 32a-32c are still missing. The output shaft 10 is fabricated so that it is already provided with the desired output end 40b in order to be able to couple it to the adjustment component to be moved.

During production, the output shaft 10 is moved so that the sensor device 20 supplies a predetermined value. Based on the ideal waveform 25, the setpoint is known for the angle at which the output shaft 10 should be turned.

It is then determined where the output shaft 10 is located in reference to the xy coordinate system, within which the positions of the installation points on the installation surface are specified. This results in the deviation $\alpha_0$ to be compensated for. The housing 30 and thereby the actuator as a whole is then turned in the xy-plane until this deviation $\alpha_0$ is compensated for. The determination of the deviation $\alpha_0$ can, as an example, be accomplished by providing a complementary part with the desired position at the output end 40b. The housing 30 is then rotated until it can be connected with the complementary part.

The mounting holes 32a-32c are subsequently fitted using a suitable method, such as punching, drilling, cutting, etc. The tool for doing so can be a punching tool, drill, laser, water jet or another tool suitable for removing material.

It is conceivable that each of the mounting points 31a-31c is already provided with a prefabricated through-hole, so that there is less material to be removed while fitting the mounting holes 32a-32c.

A conceivable alternative is designing the mounting points 31a-31c with movable mounting elements which are provided with mounting holes 32a-32c. During production, the mounting elements are moved until the measured deviation $\alpha_0$ is compensated for. The mounting elements are subsequently fixed.

EXAMPLE 3

During the production of the actuator, it is also possible to adjust the position of the sensor device 20 to the measured deviation $\alpha_0$. As an example, a variety of housing elements can be provided which are formed in the manner of the housing element 30a, but they differ in that the mounting mechanism for mounting a part of the sensor device varies, so that this part can be mounted to the housing element with a varying angular position in relation to the mounting points 31a-31c. As an example, the respective housing element has a mounting mechanism in the form of pins, which fit into cavities in the sensor device part during installation, whereby the position of the pin on the housing elements varies.

During the production of the actuator according to FIG. 2, it is envisaged that the conducting paths 22 are located on the carrier 23, the position of which is adjusted on the housing element 30a. To determine the deviation $\alpha_0$, this carrier 23 is assembled together with components 5a, 10 and 21 and the output shaft 10 moved so that the sensor device 20 supplies a certain signal value $\alpha_0$. The comparison between the setpoint for the angular position of the output shaft 10 and the actual angular position supplies the information corresponding to the deviation $\alpha_0$. At this stage of production, the components 5a, 10 and 21 are then paired with that housing element 30a for which, following assembly, the deviation is cancelled out or at least reduced.

Figure 9:
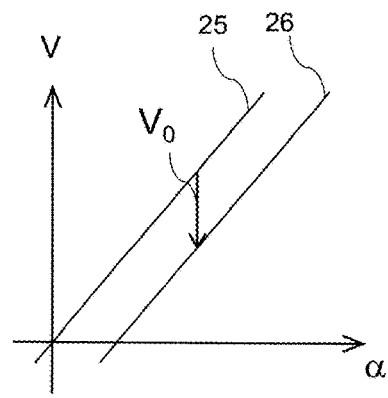

In the above examples, the angular position of the output shaft is adjusted in relation to the sensor device in order to compensate for the deviation $\alpha_0$. It is also possible to adjust the sensor device 20 so that the sensor signal will be changed. FIG. 9 shows the same graph as FIG. 4 with the ideal waveform 25 and the waveform 26 from an uncalibrated sensor device 20. As can be seen, the values for the waveform 26 are displaced along the vertical axis from the ideal waveform 25 with a deviation of $V_0$.

In order to compensate for this deviation $V_0$, a mechanical adjustment of the sensor device 20 is carried out.

In doing so, the output shaft 10 is arranged at a previously determined position and the signal supplied by the sensor device 10 recorded, which defines an actual value. Based on the ideal waveform 25, the signal setpoint for the sensor device 20 is known that should be supplied at the predetermined angular position of the output shaft 10 by the sensor device 20. A mechanical adjustment then takes place so that the sensor device 20 supplies a signal value that is adjusted to the setpoint. This can be achieved in a variety of ways.

EXAMPLE 4

Exchanging or Selecting the Printed Circuit Board

In an embodiment according to FIG. 2, the sensor device 20 has a printed circuit board 23 and one or more conducting paths 22, which contact a rotary slider 21. The conducting paths 22 each generate a resistive track so that a different signal value is supplied, depending on the angular position of the slider.

The production process provides a large number of printed circuit boards 23. Due to manufacturing tolerances, the printed circuit boards 23 are not identical. This can, as an example, result in the conducting paths 22 having varying resistances. It is possible to carry out "matching," in which a printed circuit board 23 with a compatible resistance is selected from those produced so that a sensor device 20 with a reduced deviation $V_0$ is the result.

It is also conceivable that a specific variety of printed circuit boards 23 be provided. As an example, a number of classes of printed circuit boards 23 can be envisaged, whereby each class has a certain deviation from the actual value of the resistance of a conducting path 22. As an example, five classes are envisaged, each with a respective deviation of −4%, −2%, 0, +2% and 4%. Of course, the number of classes and the deviation of each can also be different. During production, a printed circuit board 23 is selected from that class having the lowest the deviation $V_0$.

EXAMPLE 5

Configuring the Printed Circuit Board

Another possibility for adjustment exists by specifically configuring the printed circuit boards 22 subsequent to the production of the actuators.

As an example, irregularities can occur in the printing of the conducting paths 22 during the production of the printed circuit boards 23. These irregularities are subsequently corrected using, for example, a laser in order to reduce the deviation $V_0$.

Figure 10:
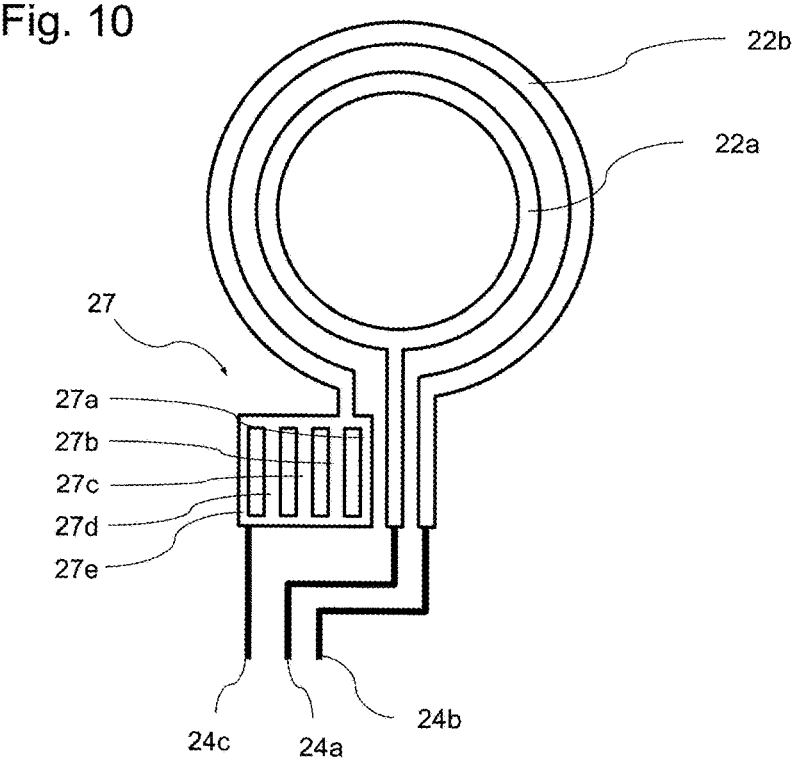

It is also possible to envisage an area that is connected to a conducting path 22 and is configured specifically in order to change the resistance of said area. FIG. 10 shows a relevant variation. A first conducting path 22a and a second conducting path 22b can be seen there, which extend around the center. The first conducting path 22a has a closed loop, and is connected to a first connector 24a. The second conducting path 22b has an open loop, whereby the one end is connected to a second connection 24b and the other end is connected via an area 27 to a third connection 24c. The area 27 consists of parallel, interconnected conducting path segments 27a-27e. To change the resistance, one or more of these conducting path segments 27a-27e are severed during production using, as an example, a laser. FIG. 10 only shows one possible example of the area 27. Of course, a variety of designs and geometries are conceivable.

EXAMPLE 6

Selecting the Slider

The length of a slider 21 determines the place where it contacts a conducting path 22. Sliders 21 of different lengths can be provided. During actuator production, a slider 21 is chosen of such length that the result is a sensor device 20 with a reduced deviation $V_0$.

EXAMPLE 7

Configuring the Slider

In the production of an actuator, the slider 23 is specifically prepared afterwards, for example by bending, cutting or another mechanical process. In doing so, the place at which the slider contacts a conducting path 22 is changed, and the signal supplied by the sensor device 20 is correspondingly adjusted.

The mechanical adjustment in examples 4-7 can take place at the respective actuator during its manufacture. In order to be able to define an actual value, a signal is from the sensor device 20 is required. This can be achieved, as an example, by assembling and measuring the components necessary for the sensor device 20 to generate a signal. If the deviation of the actual value from the setpoint is too great, at least one of the components is exchanged or configured.

It is also conceivable that only one part of the sensor device 20 is assembled and measured at a measurement station, which comprises the remaining portion of the sensor device 20 in the form of standard components. Using the measured data, the mechanical adjustment and the assembly of the remaining actuator components takes place. As an example, the slider and the output shaft are assembled and measured with a standard printed circuit board at a measurement station, and, using the measured values, a compatible printed circuit board is selected so that the sensor device 20 supplies a value for the predetermined angular position of the output shaft, resulting in a reduced deviation from the setpoint.

EXAMPLE 8

Configuration of Subsequent Actuators During Production

As a further example, it is also possible to continuously measure the actuators produced and to use this data in order to adjust the manufacture of subsequently produced actuators. As an example, the values supplied by the respective sensor device for the predetermined angular position of the output shaft are recorded for the actuators produced. The values are then compared to one another and, as an example, a moving mean is developed, which defines the actual value. If this actual value deviates too greatly from the setpoint, then the actuator production will be adjusted. As an example, such a printed circuit board or such a slider is selected for the respective actuator which results in a reduction in the deviation between the setpoint and the actual value. Alternatively or additionally, the printed circuit board and/or the slider is configured in order to reduce the deviation. Using this type of process, a deviation of the actual value from the setpoint can be compensated for in production. However, the variation by which the actual value deviates from the setpoint remains unchanged.

Various possibilities for the mechanical adjustment are summarized in the following table:

|  |  | Compensation for production variation | Upgrading of component necessary | Production of components in different variations | Individual adjustment of component |
|---|---|---|---|---|---|
| Additional part for output shaft |  | Yes | No | Yes | No |
| Adjusting mounting points |  | Yes | No | No | Yes |
| Selecting printed circuit board | previous measurement | Yes | Yes | Yes/No | No |
|  | mean value | No | No | Yes/No | No |
| Configuring printed circuit board | previous measurement | Yes | Yes | No | Yes |
|  | mean value | No | No | No | Yes |
| Selecting slider | previous measurement | Yes | Yes | Yes | No |
|  | mean value | No | No | Yes | No |
| Configuring slider | previous measurement | Yes | Yes | No | Yes |
|  | mean value | No | No | No | Yes |

Row three in the table, beginning with "additional part for output shaft," corresponds to example 1. In this type of production, the variation by which the actual value for the individual actuators deviates is compensated for (see "yes" in the column three). It is not necessary to upgrade the component (see "no" in column four), although different variations of the additional part are to be envisaged (see "yes" in column five). The additional part need not be configured (see "no" in column six).

Column four in the table, beginning with "adjusting mounting points," corresponds to example 2. In contrast to example 1, no prefabrication of the support surface in different variations is necessary here. The mounting points are adjusted individually.

Row five in the table, beginning with "selecting printed circuit board," is related to examples 4 and 8. The row with the note "previous measurement" corresponds to example 4, in which the at least partially assembled sensor device is measured and in accordance with the measurement result, a printed circuit board is selected and/or the printed circuit board is exchanged. Depending on the application, different variations of the printed circuit board can be provided, or the variation in production of the printed circuit board can be exploited (see "yes/no" in column five). The row with the note "mean value" corresponds to example 8, in which, during production, a printed circuit board is selected using an actual value based on previously produced actuators, for example in the form of a moving mean.

Row six in the table, beginning with "configuring printed circuit board," is related to examples 5 and 8. Here, too, both possibilities are specified by "previous measurement of the printed circuit board" with a corresponding adjustment during production (example 5) as well as adjustment on the basis of a moving mean (example 8).

In an analogous manner, row six in the table, beginning with "selecting slider," summarizes the possibilities according to examples 6 and 8, and row seven in the table, beginning with "configuring slider," summarizes the possibilities according to examples 7 and 8.

The examples shown here enable the manufacture of an actuator having a sensor device for sensing the exact angular position of the output shaft. To do so, the sensor device need not be made with high precision. Any production-related measurement imprecision can be compensated for in a simple and cost-effective manner by the mechanical adjustment envisaged. The actuators produced can be mounted on the mounting surface envisaged without the need for further adjustments. In particular, the electronic controller does not necessarily have to be reprogrammed in order for the exact angular position of the output shaft to be sensed.

The actuators produced can, for example, be used in a ventilation, heating and/or air conditioning unit in a motor vehicle, in particular an automobile, for the controlled movement of flaps.

Given the preceding description, numerous variations are accessible to a person skilled in the art without departing from the protective scope of the invention, which is defined by the claims. It is thus conceivable, for example, that the different mechanical adjustment measures described here be combined with one another. It is in particular conceivable that both the angular position of the output shaft in relation to the sensor device as well as the sensor device itself be specifically changed so that a combined compensation for the deviation along the horizontal axis according to FIG. 4 as well as the vertical axis according to FIG. 9 is the result.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A method for the manufacture of actuators comprising an electric motor (1) for driving an output shaft (10), a sensor device (20) for generating a signal which is a function of the angle at which the output shaft is rotated, and a support surface (30a) with mounting points (31a-31c) for the mounting of an actuator, wherein the following method steps are carried out in the production of a said actuator:

A1) Providing an arrangement comprising at least the output shaft (10) and the sensor device (20), A2) Driving the output shaft so that the sensor device supplies a predetermined signal value, which defines a setpoint for the angular position of the output shaft, A3) Defining the actual angular position of the output shaft as an actual value, and A4) mechanically adjusting at least one actuator component, which takes place depending on the deviation between the actual value and the setpoint such that the output shaft has an output end (40b), the angular position of which is compared to the setpoint.

2. The method according to claim 1, wherein an additional components (40) connectable with the output shaft (10) each have an input end (40a) and at output end (40b), which are arranged by being rotated at an angle (β) to one another, wherein the angle varies in the case of at least two additional components (40), wherein, for step A1, the arrangement comprises the electric motor (1), the output shaft (10), the sensor device (20) and the support surface (30a) with the mounting points (31a-31c), and, for step A4, the additional component is selected from the additional components provided and is connected to the output shaft.

3. The method according to claim 1, wherein, for step A1, the arrangement comprises the electric motor (1), the output shaft (10), the sensor device (20) and the support surface (30a) with the mounting points (31a-31c), and, for step A4, the arrangement is fabricated to be rotated with at least one mounting hole (32a-32c) as a mounting point (31a-31c).

4. The method according to claim 1, wherein, for step A3, the actual angular position of the output shaft (10) is visually identified, the output shaft preferentially having a marking (11) for this purpose.

5. A method for the manufacture of actuators comprising an electric motor (1) for driving an output shaft (10), a sensor device (20) for generating a signal which is a function of the angle at which the output shaft is rotated, and a support surface (30a) with mounting points (31a-31c) for the mounting of an actuator, wherein the following method steps are carried out in the production of said actuator:

B1) Defining a setpoint for the signal that the sensor device (20) should supply for a predetermined angular position of the output shaft (10), B2) Providing an arrangement comprising at least one part of the sensor device (20), B3) Determining a setpoint using data supplied for the predetermined angular position by a sensor device comprising the part provided in step B2, and B4) mechanically adjusting at least one actuator component, which takes place depending on the deviation between the actual value and the setpoint so that the signal supplied by the sensor device (20) for the predetermined angular position of the output shaft (10) is compared to the setpoint.

6. The method according to claim 5, wherein the element provided for step B2 has a printed circuit board (23) and, for step B3, the element is measured to obtain the actual value, wherein, in cases where the deviation between the actual value and the setpoint exceeds a threshold value, at least one of the following steps is carried out in step B4 in order to reduce this deviation:

the printed circuit board (23) is exchanged for another printed circuit board, the printed circuit board (23) is mechanically configured.

7. The method according to claim 6, wherein the arrangement provided in step B2 has a slider (21) and, for step B3, the arrangement is measured to obtain the actual value, wherein, in cases where the deviation between the actual value and the setpoint exceeds a threshold value, at least one of the following steps is carried out in step B4 in order to reduce this deviation:

the slider (21) is exchanged for another slider, the slider (21) is mechanically configured.

8. The method according to one of the claims 7, wherein a selection of components is provided:

printed circuit boards (23) with varying resistances and/or sliders (21) of varying lengths.

9. A method for the manufacture of actuators comprising an electric motor (1) for driving an output shaft (10), a sensor device (20) for generating a signal which is a function of the angle at which the output shaft is rotated, and a support surface (30a) with mounting points (31a-31c) for the mounting of an actuator, wherein the following method steps are carried out in the production of said actuator:

C1) Defining a setpoint for the signal that the sensor device (20) should supply for a predetermined angular position of the output shaft (10), C2) Providing an arrangement comprising at least the output shaft (10) and the sensor device (20), C3) Determining a setpoint based on data comprising the signal value for the predetermined angular position supplied by the sensor device in the arrangement provided in step C2, C4) Defining a deviation between the actual value and the setpoint, wherein, for an actuator that is to be subsequently manufactured, a mechanical adjustment of at least one component is carried out in cases where a threshold value is exceeded, which takes place depending on this deviation in order to reduce said deviation.

10. The method according to claim 9, wherein, for step C3, the actual value is defined in that the signal values supplied by the respective sensor device (20) for the predetermined angular position of a number of produced actuators are determined and compared to one another, the mean value of these signal values being preferentially defined as an actual value, and a moving mean of these signal values being most preferentially defined as an actual value.

11. The method according to claim 10, wherein printed circuit boards (23) are provided and measured to obtain a resistance value, wherein the mechanical adjustment takes place using the deviation between the actual value and the setpoint to select a printed circuit board with that resistance value which results in a reduction in the deviation.

12. The method according to claim 11, wherein the respective additional component (40) has an input end (40a) for connecting with the output shaft (40) and an output end (40b), which is arranged by being rotated at an angle β, wherein the resulting mechanical difference is that the angle varies.

13. The method according to one of the claims 11, wherein the output shaft (10) has a connecting end (12), which is essentially compatible in form with the input end (40a) of an additional component (40).

14. The method according to one of the claims 11, wherein the output shaft (40) and an additional component (40) can be assembled together in a torsionally rigid connection.

15. A method according to claim 9, wherein the mechanical adjustment of at least one component takes place, in which at least one of the following steps is carried out:

the at least one component (10) is paired with an additional component (40), which, depending on the deviation between the actual value and the setpoint, is selected from prepared additional components that are mechanically different, the at least one component (21; 23; 30a) is configured depending on the deviation between the actual value and the setpoint, the at least one component (21; 23; 30a) is chosen depending on the deviation between the actual value and the setpoint from a prepared selection of components that are mechanically different.

16. The method according to claim 9, wherein at least one mounting point (31a-31c) has a movable element with a prefabricated mounting hole, which is configured by a mechanical adjustment.

17. The method according to the claim 16, wherein the selection of components comprise support surfaces (30a) having a means of connection for connecting a part (23) of the sensor device (20) so that this part is arranged by being rotated at an angle in relation to the support surface, wherein the resulting mechanical difference is that the angle varies.

18. The method according to claim 9, wherein the mechanical adjustment is carried out by at least one of the mounting points (31a-31c) of the support surface (30a) being prepared and/or configured.

19. The method according to claim 18, wherein, during the fabrication of at least one mounting point (31a-31c), a mounting hole (32a-32c) is fabricated on the support surface (30a).

20. The method according to claim 9, wherein the arrangement has a component with conducting paths (22a, 22b) and parallel, interconnected conducting path segments (27a-27e), which can be severed to mechanically adjust the component.

* * * * *